United States Patent [19]
Clark et al.

[11] Patent Number: 5,751,546
[45] Date of Patent: May 12, 1998

[54] CRADLE ASSEMBLY FOR PORTABLE COMPUTING DEVICES AND METHOD

[75] Inventors: Jay Clark, Ione; Jonathan LaMarche; Robert J. Tuttle, Sr., both of Spokane, all of Wash.

[73] Assignee: Itronix Corporation, Spokane, Wash.

[21] Appl. No.: 670,723

[22] Filed: Jun. 21, 1996

[51] Int. Cl.⁶ .............................. G06F 1/16; H05K 1/16
[52] U.S. Cl. .......................... 361/686; 361/683; 439/310
[58] Field of Search .................................. 361/683–686; D14/107; 439/131, 310, 928.1; 364/708.1; G06F 1/16

[56] References Cited

U.S. PATENT DOCUMENTS

| | | | |
|---|---|---|---|
| D. 376,585 | 12/1996 | Wathen et al. | D14/107 |
| 5,196,993 | 3/1993 | Herron et al. | 361/686 |
| 5,461,546 | 10/1995 | Kobayashi et al. | 361/796 |
| 5,535,093 | 7/1996 | Noguchi et al. | 361/686 |
| 5,606,594 | 2/1997 | Register et al. | 379/58 |
| 5,633,782 | 5/1997 | Goodman et al. | 361/683 |

OTHER PUBLICATIONS

"Prentice Hall's Illustrated Dictionary of Computing", Prentice Hall, 1995, pp. 172–173.
"PC Magazine", Apr. 25, 1995, Article from Austin, p. 250.

*Primary Examiner*—Lynn D. Feild
*Attorney, Agent, or Firm*—Wells, St. John, Roberts, Gregory & Matkin, P.S.

[57] ABSTRACT

This invention comprises a cradle assembly for supporting a portable electronic device. The assembly includes a base constructed and arranged to receive the portable electronic device. The assembly also includes a first mating member pivotally carried on the base and configured to mate with a complementary mating member of the device. A second mating member is also included, and is configured in spaced apart relation with the first mating member and movably carried on the base, the first and second mating members cooperating to releasably retain the device therealong. In another form, the invention comprises a base, a mating member carried in movable relation on the base, and an electrical connector configured to engage with a complementary electrical connector on a device after it is mated with the mating member via a complementary mating member. In yet another form, the assembly includes a portable electronic device having first and second mating members for mating and demating with complementary base mating members. In even yet another form, the invention comprises a method for removably retaining a portable electronic device to a cradle assembly.

30 Claims, 11 Drawing Sheets

CRADLE ASSEMBLY FOR PORTABLE COMPUTING DEVICES AND METHOD

TECHNICAL FIELD

This invention relates generally to portable electronics equipment, and more particularly to cradle assemblies and methods for removably supporting portable computing devices such as portable, laptop, notebook and pen computers.

BACKGROUND OF THE INVENTION

Portable electronic devices, such as notebook computers, dataform readers, barcode readers, portable data terminals, work slates, pen computers, and touch screen displays are typically used in environments where their portability is required. Therefore, they are typically equipped with a battery power supply. Such devices need to be intermittently connected with an external power supply in order to recharge the battery. Otherwise, the battery has to be replaced periodically. One convenient way is to provide a cradle assembly, or docking station that supports the device and also provides an external power supply. Additionally, the cradle assembly includes features that enable coupling of the device with peripheral components such as connectors for expansion ports and data buses.

Due to the portability of many such electronic devices, they are typically remotely powered by a battery pack, enabling their use without connection to a power supply or hard wired communication lines. Typically, such devices are equipped with one or more forms of memory and an I/O port (serial communication port), enabling intermittent hook-up to a data communications network for transmitting and receiving information therebetween. Additionally, an AC power supply is frequently provided via a power supply port for intermittently connecting the device to a separate power supply during operation, or for recharging batteries contained therein.

One way of supplying expansion ports and external power is to nest an electronic device, such as a notebook computer, on a docking station. For example, a docking station can have a recess for receiving the computer, with mating connectors that couple with ports on the computer to connect with peripheral devices and also a power supply However, such docking stations require that an operator use two hands to align and secure the device and its connectors to the cradle. In some cases, the device must also be further fastener to the docking station with clamps or fasteners. When secured atop the docking station, the computer can be transformed into a full-function desktop computer having full local area networking capabilities. However, such docking stations are still too cumbersome for frequent short term mating and demating, requiring significant operator effort when engaging and disengaging the device from the docking station. Therefore, improvements are needed to simplify mating and demating of the device from the cradle. Particularly such improvements are needed to facilitate use with service personnel who must frequently mate and demate the device from a vehicle-based cradle when making a large number of customer service calls.

The present invention relates to an improved cradle, or docking station and method that minimizes the operator effort necessary when mating and demating an electronic device from the cradle. Such improvements further facilitate expansion port coupling and power supply coupling to the device when mated to the cradle.

BRIEF DESCRIPTION OF THE DRAWINGS

Preferred embodiments of the invention are described below with reference to the following accompanying drawings.

FIG. 6 is a side elevational view of a notebook computer as it is being positioned to mate with the cradle assembly of FIGS. 1–5;

FIG. 9 is a side elevational view of the notebook computer and cradle assembly taken later in time than FIGS. 7 and 8, after the front portion mating features have been engaged by sliding the notebook computer backward;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect, this invention comprises a cradle assembly for supporting a portable electronic device. The assembly includes a base constructed and arranged to receive the portable electronic device. The assembly also includes a first mating member pivotally carried on the base and configured to mate with a complementary mating member of the device. A second mating member is also included, and is configured in spaced apart relation with the first mating member and movably carried on the base, the first and second mating members cooperating to releasably retain the device therealong.

According to another aspect, this invention comprises a cradle assembly for supporting a portable electronic device. The cradle assembly includes a base constructed and arranged to receive the portable electronic device and a mating member carried in movable relation on the base and configured to mate with a complementary mating member of the device. The cradle assembly also includes an electrical connector configured in spaced apart relation with the mating member and constructed and arranged to mate in aligned electrical engagement with a complementary electrical connector carried on the device. The mating member is mated in engagement with the complementary mating member of the device so as to engage the electrical connector in aligned electrical engagement with the complementary electrical connector on the device as the device is moved in combination with the mating member into engagement therebetween.

According to yet another aspect, this invention comprises a method for removably retaining a portable electronic device to a cradle assembly. The method includes the steps of providing a cradle assembly having a base with a first mating member pivotally carried by the base, and a second mating member spaced apart from the first mating member and movably carried by the base; providing a portable electronic device having a complementary mating member configured to mate with the first mating member, and another complementary mating member configured to mate with the second mating member; positioning the portable electronic device so as to engage together the cradle assembly first mating member and the device complementary mating member; pivoting the portable electronic device about the engaged cradle assembly first mating member and the device complementary mating member so as to bring the cradle assembly second mating member and the device another complementary mating member into communication; and engaging the cradle assembly second mating member and the device another complementary mating member so as to releasably retain the device cooperatively between the cradle first and second mating members.

Figure 1:
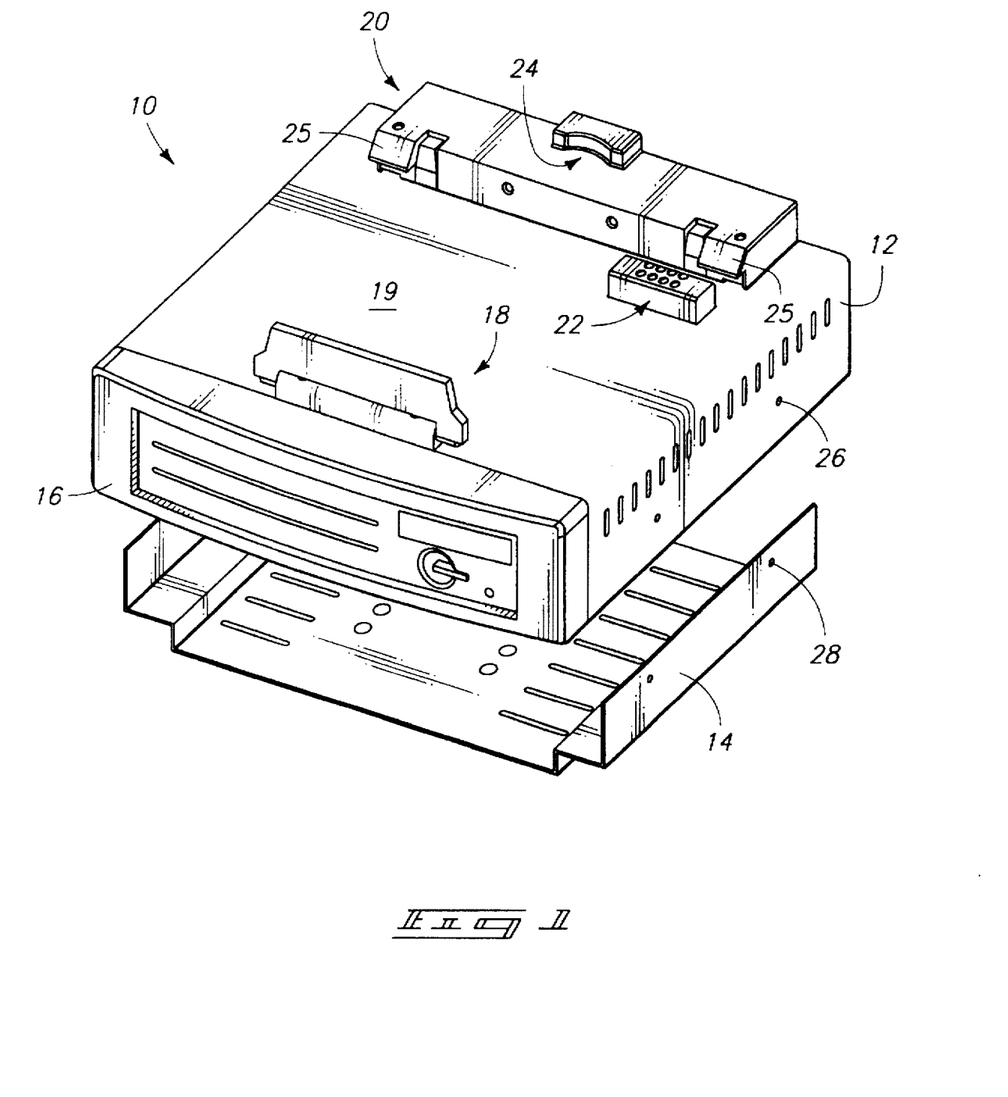
FIG. 1 is a perspective view of a cradle assembly for receiving a notebook computer having mating/demating features embodying this invention.

These and other aspects of the invention are described in more detail with reference to FIGS. 1–9. The present invention provides a cradle assembly for supporting a portable electronic device. Referring in more detail to the drawings, FIG. 1 illustrates a cradle, or docking station 10 configured to releasably support a portable electronic device, such as a notebook computer (not shown). Cradle 10 comprises a main base 12 formed in the shape of a housing for housing associated peripheral components including power supplies, data communications buses, disk drives, and other memory devices. Cradle 10 also comprises a u-shaped base 14 formed from a single piece of folded sheet metal and configured to mount base 12 to a table or support structure (not shown). A bezel 16 forms the front of base 12 where controls and removable data storage devices such as floppy disks can be easily accessed by a user. To facilitate mounting of a portable electronic device onto cradle 10, a dovetail assembly 18 is pivotally supported on a top face 19 of base 12, along a forward portion. Assembly 18 forms a first mating member for engaging with a complementary mating member on an electronic device. Additionally, a latch assembly 20 is movably carried on face 19, along a rear portion of base 12 to enable releasable mounting of the device with the cradle 10. Assembly 20 forms a second mating member for engaging with another complementary mating member on an electronic device. Assembly 20 is biased into a loading position to facilitate engagement with mounting features of a device to be mounted thereon.

According to the construction of FIG. 1, a portable electronic device (not shown) having complementary mating features is releasably retained on cradle 10 by assemblies 18 and 20, while a retractable connector assembly 22 electrically connects with the retained device to provide external power supply and communications port couplings. Connector assembly 22 has a spring biased retractable hard plastic body with a plurality of apertures configured to shield and protect a plurality of retractable and independently spring biased electrical connectors carried therein. The hard body of assembly 22 ensures that the internally housed connectors are not inadvertently damaged or bent during loading and unloading of a device from cradle 10.

Latch assembly 20 of FIG. 1 includes a trigger 24 positioned to enable user biasing of a pair of laterally spaced apart fingers 25 in a direction away from assembly 18. Assembly 20 is retained in a normal resting state by one or more internal springs, requiring a user to overcome the spring force when biasing fingers 25 away (outward) from assembly 18 during mating and demating of a device. Translational movement of fingers 25 away from assembly 18 is required when mating and demating a device with cradle 10. Alternatively, rotational or other kinematic movement can be used to engage and disengage fingers 25 from a device. Trigger 24 is finger manipulated by a user, pulling fingers 25 away from assembly 18 in order to demate a device from cradle 10. Fingers 25 on assembly 20 each have a sloped, or bevelled surface to facilitate outward movement of fingers 25 when a device is urged downwardly into contact with the sloped surfaces and onto cradle 10. When trigger 24 is released, spring biasing of assembly 20 presents fingers 25 in their normal resting state, closer in proximity to dovetail assembly 18, but restrained by translation-limiting features. Assembly 20 includes such translation limiting features that present fingers 25 in a desired spaced apart position from assembly 18 to facilitate mounting of a device to cradle 10 without requiring that a user manipulate trigger 24.

To facilitate servicing of cradle 10, base 12 of FIG. 1 is removably mounted to u-shaped base 14 with a plurality of threaded fasteners (not shown). Base 14 is permanently mounted to a support structure, while base 12 is removably mounted to base 14. Apertures 28 in base 14 and apertures in base 12 align to receive a fastener through each pair of apertures, respectively. In this manner, base 14 can be permanently mounted to the support structure, for example, to a work table within a service vehicle, while base 12 can be more easily removed to enable periodic maintenance and repair.

Figure 2:
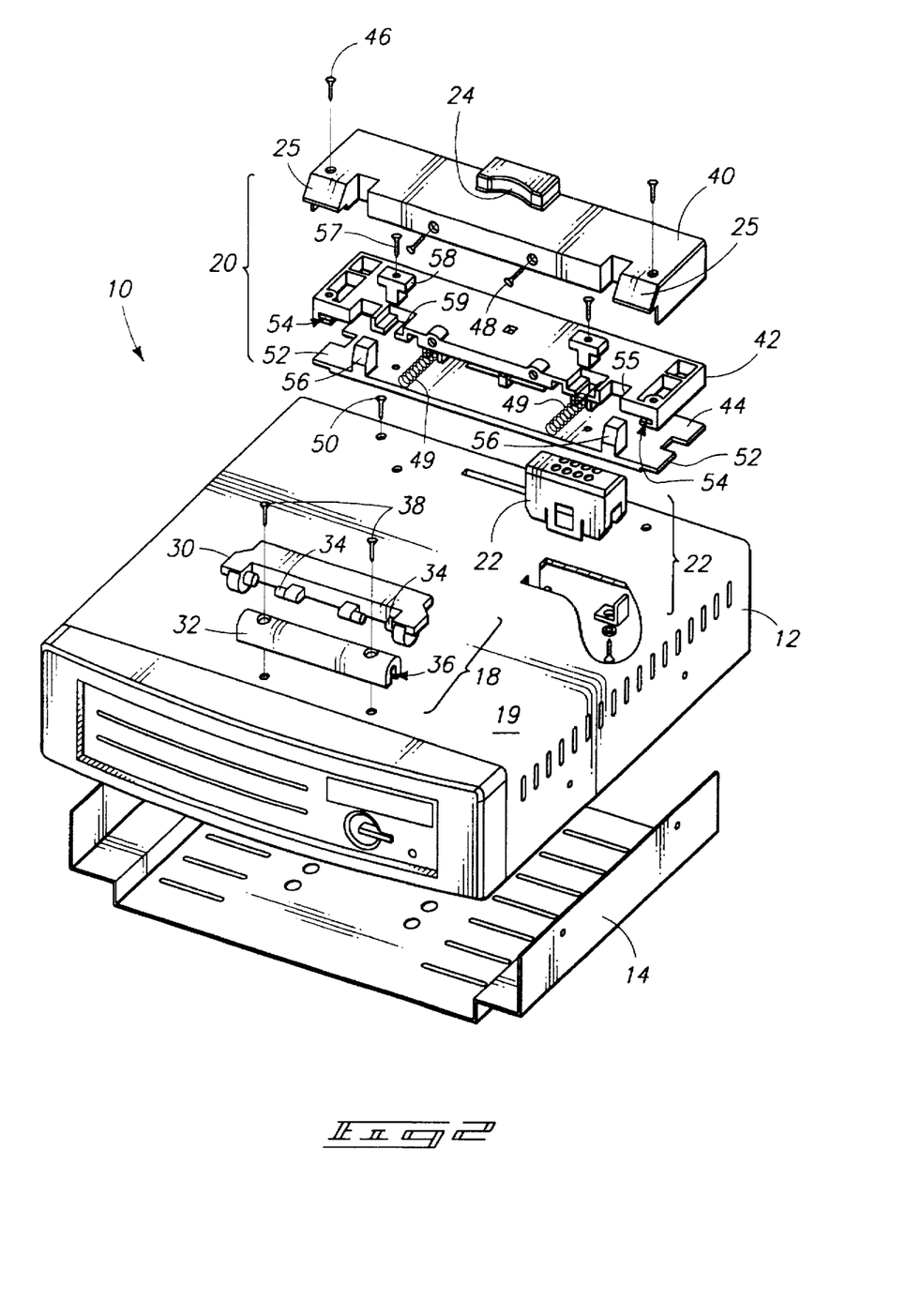
FIG. 2 is an exploded perspective view of the cradle assembly of FIG. 1.

As shown in FIG. 2, dovetail (or tongue) assembly 18 comprises a dovetail 30 that is pivotally mounted to base 12 via a retainer 32. Retainer 32 pivotally supports dovetail 30 via a plurality of pivot pins 34 that extend from the dovetail, along a common axis. Pins 34 are received within a complementary semi-circular portion of a groove 36 of the retainer. A plurality of associated transverse slots (see FIG. 5) enable dovetail 30 to pivot relative to retainer 32, yet limit its rotation between a substantially vertical raised position and a horizontal lowered position. A spring (see FIG. 5) biases dovetail 30 into the substantially vertical raised position, until a device is loaded onto top face 19, urging against the spring and causing dovetail 30 to pivot into conforming, or substantially planarized nested engagement with a bottom face of the device. A plurality of threaded fasteners 38 retain dovetail assembly 18 together by securing retainer 32 onto top face 19, trapping dovetail 30 pivotally therebetween.

According to FIG. 2, latch assembly 20 is formed by securing together a latch 40 and a slide 42, then mounting them for guided fore/aft movement on a latch guide 44. A pair of threaded fasteners 46 retain latch 40 and slide 42 together at each top end, respectively. Another pair of threaded fasteners 46 retain latch 40 and slide 42 together along a forward vertical edge portion, within a mid-portion. Fasteners 46 also serve to retain a pair of compression coil springs 49 in engagement with slide 42 at one end and receiving pockets in guide 44 at an opposite end. In this manner, latch 40 and slide 42 are biased toward assembly 18 in a normal resting state. Loading of a device into urged contact with the fingers 25 of latch 40 causes it to move aft, away from assembly 18, until it is loaded. Similarly, rearward retraction of trigger 24 by a user's hand or fingers will retract the assembled latch 40 and slide 42 away from assembly 18, allowing removal of a mated device from cradle 10. To ensure fore/aft translation of assembled latch 40 and slide 42 on guide 44, a pair of tenons 52 are formed by each end of guide 44. Tenons 52 are received in a complementary groove (or mortise) at each end of slide 42.

In operation, assembled latch 40 and slide 42 of FIG. 2 slide fore and aft on tenons 52, guiding latch movement of latch fingers 25 therealong. To present the latch fingers 25 in proper position relative to assembly 18 for receiving a device, motion limiting stops 56 are formed from guide 44 and slidably received in slots 55, serving to limit forward movement of assembled latch 40 and slide 42. Stops 56 also serve to guide fore/aft movement of latch 40/slide 42 on guide 44. Furthermore, a threaded fastener 57 is received through each of a pair of laterally spaced apart T-shaped guide blocks 58 to mount each block onto latch guide 44. A slotted track 59 is received between each block 58 and guide 44, thereby guiding latch 40 and slide 42 on top of guide 44 for fore and aft reciprocation.

Figure 3:
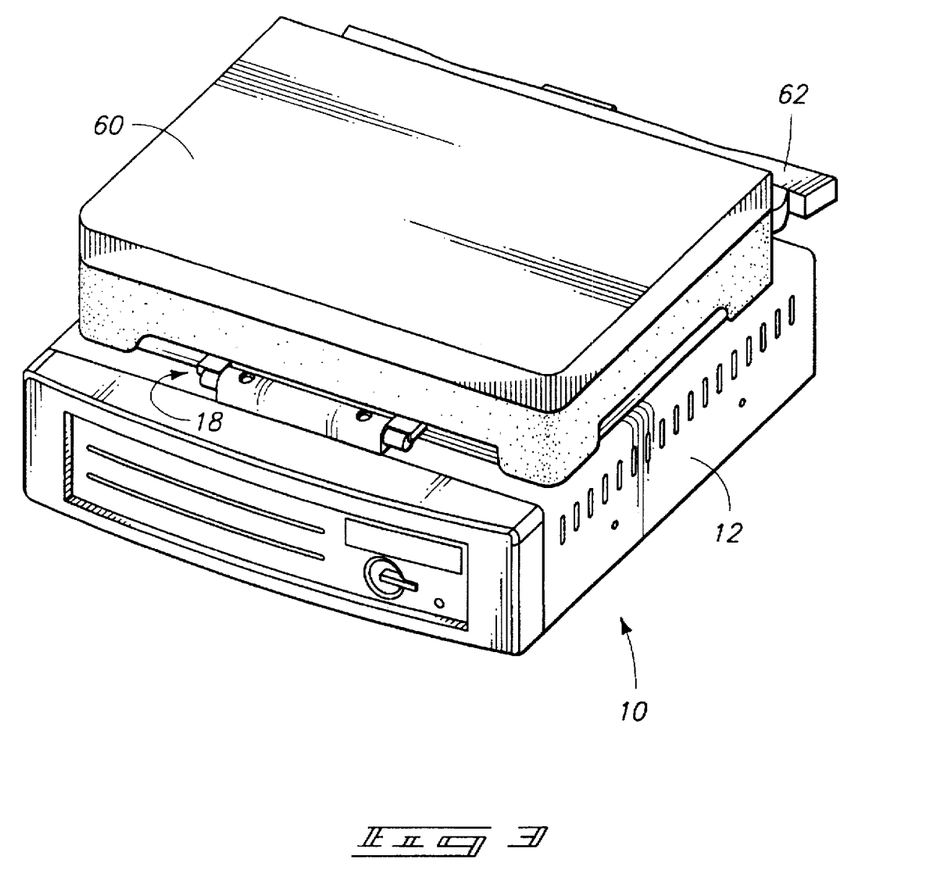
FIG. 3 is a perspective view of a notebook computer mated with the cradle assembly of FIGS. 1 and 2.

FIG. 3 illustrates cradle 10 in use with a notebook computer 60 serving as one exemplary portable electronic device. Various alternative electronic devices, many having central processing units, include pen computers, data forms readers, meter readers, laptop computers, portable computers, electronic test instruments, and various other devices requiring an external power supply to supplement battery power can be configured for use with cradle 10, simply by providing complementary mating features for engagement with the mating features of device 10. To facilitate mating and demating of device 60 from cradle 10, a handle 62 is preferably provided along a rearmost edge. Handle 62 is constructed and arranged to enable a user to single-handedly grasp the handle and the trigger of cradle 10, enabling single-handed removal of a mated (or secured) device from cradle 10.

According to FIG. 3, dovetail assembly 18 on base. 12 mates with complementary mating features along a forward edge of computer 60. Assembly 18 cooperates with latch assembly 20 (see FIG. 4) along a rearward edge in order to removably secure computer 60 to cradle 10. When loading computer 60 onto cradle 10, assembly 18 is first mated with complementary mating features on the bottom forward edge of computer 60. Subsequently, the rearward edge of computer 60 is pivoted about assembly 18 to engage the rearward mating features.

Figure 4:
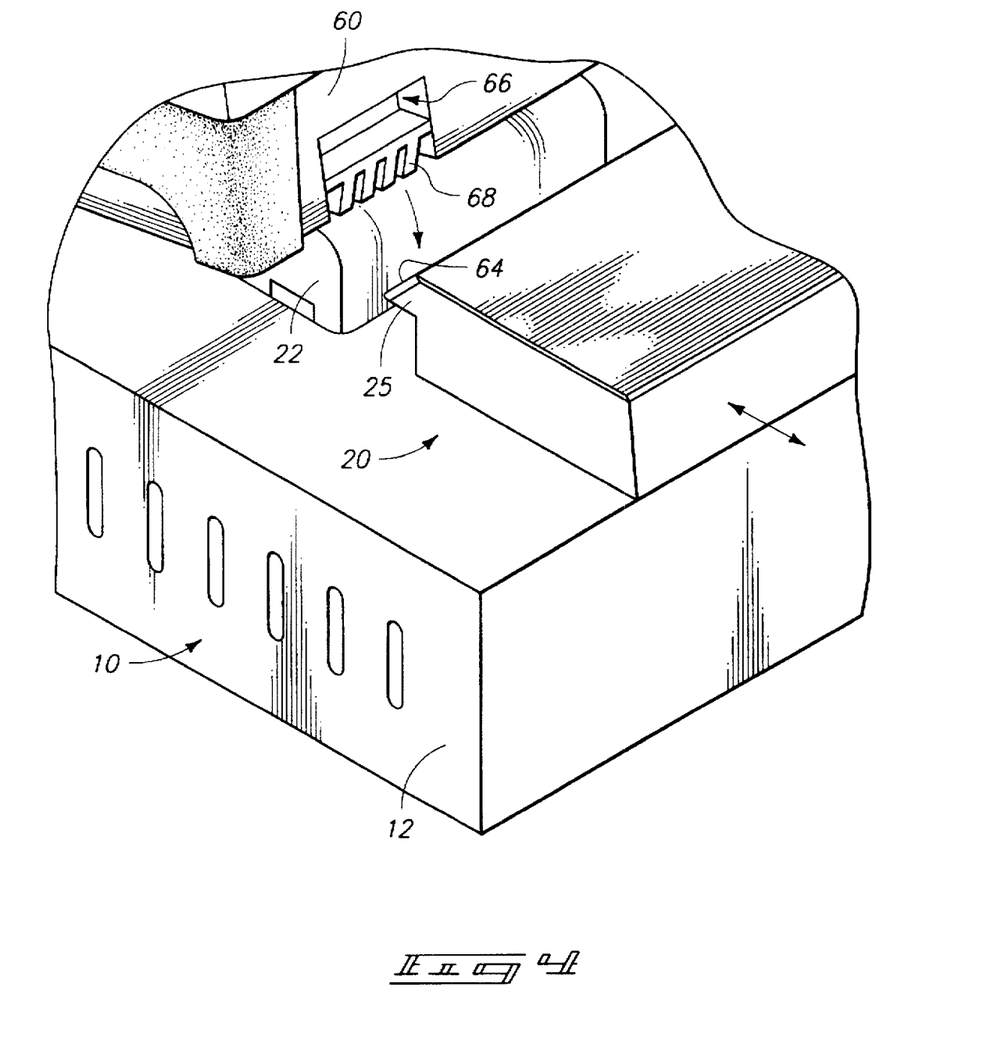
FIG. 4 is an enlarged partial perspective view of a rear portion of the mating features as a notebook computer is being received onto the cradle assembly.

FIG. 4 illustrates the construction of the rearward mating features formed by latch assembly 20 and computer 60, as computer 60 is being pivoted into engagement with cradle 10, about the forward dovetail assembly. Fingers 25 on latch assembly 20 each have a bevelled face 64 that ensures insertion of each finger 25 within a recess 66 on the rearmost edge of computer 60 as computer 60 is urged into contact with faces 64. Recesses 66 form complementary mating members for engaging with fingers 25. Urged contact against the bevelled faces causes the movable upper portion of latch assembly 20 to move rearward, away from the front dovetail assembly, causing fingers 25 to likewise move rearward. To further ensure insertion of fingers 25 within recesses 66, a rib-enforced sloped heel 68 is formed beneath each recess by computer 60. The slope on each heel 68 further facilitates engagement with each bevelled face 64 in a manner that imparts rearward movement of the upper portion of latch assembly 20 (latch 40 and slider 42 of FIG. 2) against the forces of the internal biasing springs contained within the assembly. Once fingers 25 clear heel 68, the internal springs forward bias fingers 25 within recesses 66 until a user retracts the upper portion of latch assembly in a rearward direction.

Also depicted in FIG. 4, connector assembly 22 is shown in a normal resting position, caused by internal biasing springs that raise the assembly. As computer 60 is rotated into lowered contact with faces 64, then assembly 22, and finally with the top of cradle 10, the housing and pins of connector assembly 22 retract (or lower) within cradle 10. In this lowered configuration, the internal pins of assembly 22 form electrical contact with corresponding connections on the bottom of notebook computer 60.

Figure 5:
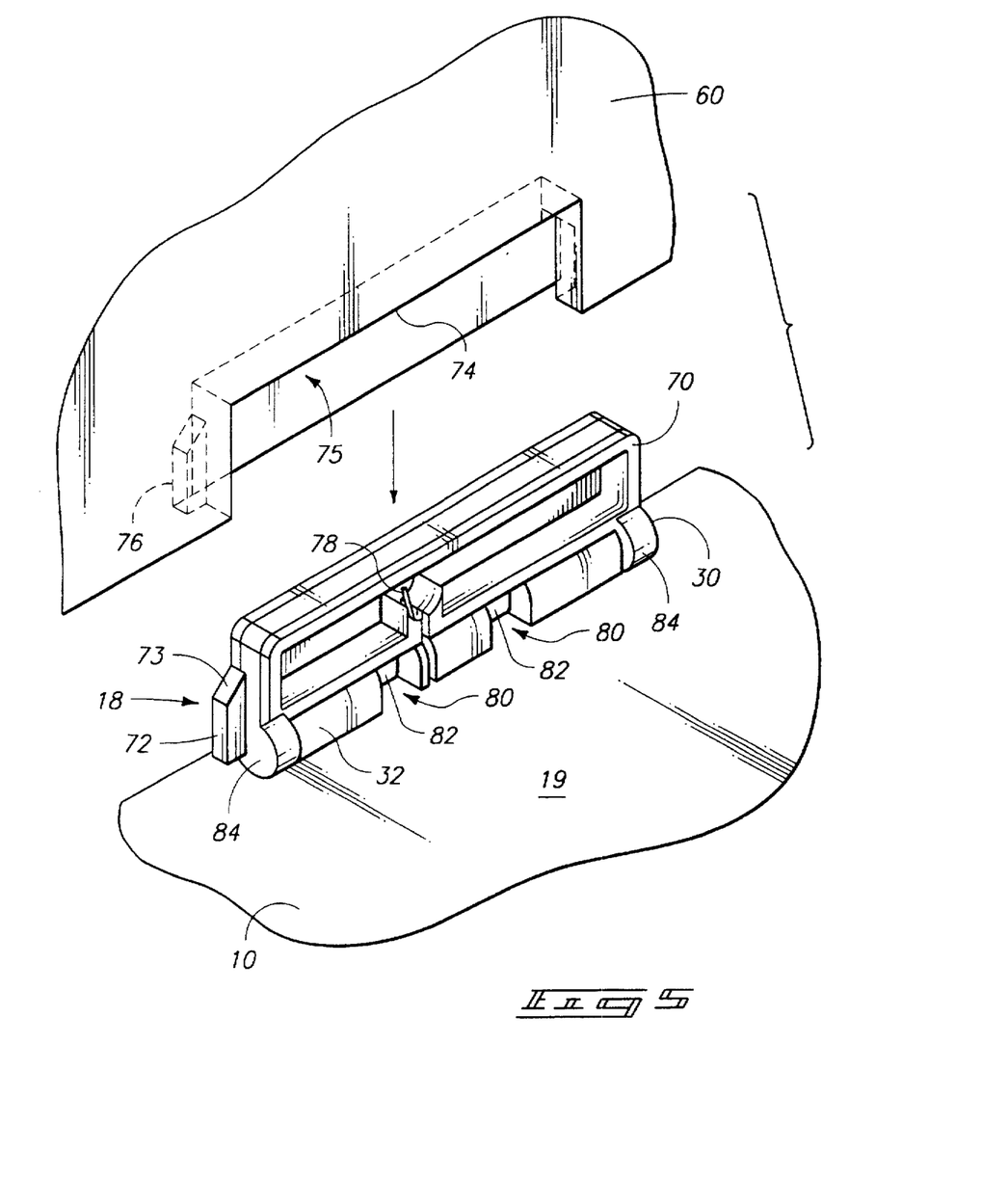
FIG. 5 is an enlarged partial perspective view of a front portion of the mating features as the notebook computer is being initially engaged with the cradle assembly.

FIG. 5 shows the forward mating features of cradle 10 and notebook computer 60 prior to being assembled. Computer 60 is shown prior to being lowered onto dovetail assembly 18 on cradle 10. Although it is possible to mate the forward mating features in this manner, a preferred single-handed loading technique will be described below with reference to FIGS. 6–11. However, to facilitate illustrating the construction, the vertical orientation of computer 60 is shown. A user can also load the computer onto the cradle with a two-handed technique.

According to FIG. 5, dovetail 30 of dovetail assembly 18 is formed from a single piece of molded hard plastic, or nylon material. A tenon 70 forms the central portion of the mating portion of dovetail 30. Tenon 70 has parallel edges that facilitate mating with a complementary member during assembly. Additionally, a pair of tapered wings, or ribs 72 are formed laterally of tenon 70, one on each side, to complete the mating portion. Each wing 72 forms a bevelled leading end 73 that facilitates alignment while mating dovetail 30 within complementary mating features provided in computer 60 by a mortise 74. Mortise 74 forms a recess in the bottom face of computer 60 along a forward edge. Mortise 74 includes an opening 75 along one side, and a pair of laterally positioned slots 76 sized and positioned to receive wings 72 in mated assembly. Mortise 74, slots 76 and opening 75 form another complementary mating member for mating with dovetail 18.

Dovetail 30 is pivotally mounted to top face 19 of cradle 10 with retainer 32, as shown in FIG. 5. A torsional coil spring 78 biases dovetail 30 into a substantially vertical orientation in its natural resting state. Spring 78 ensures conforming substantially planar (or parallel) contact between a leading face of dovetail 30 and a bottom face of computer 60 as it is dragged across face 19 during the loading step depicted in FIG. 6 below. One end of spring 78 engages within a receiving slot on the back side of tenon 70. The other end of spring 78, as well as the main coil body of the spring, are received within the inner groove of retainer 32 (see FIG. 8). Spring 78 is torsionally wound prior to assembly, ensuring vertical biasing of dovetail 30 relative to top face 19 when left in a nature resting (unloaded) state.

Retainer 32 of FIG. 5 also has a pair of transverse slots 80 that allow mounting of dovetail 30 via retainer 32 to computer 10. Dovetail 30 includes a pair of inner arms 82 that extend through slots 80, each carrying an outwardly extending pin that nests for rotation within the semicircular portion of the groove within retainer 32 (see FIG. 8). Additionally, a pair of outer arms 84 each carry an inwardly extending pin that also nests for rotation within the groove of retainer 32. Furthermore, arms 84 each form a concentric circular arc that contacts top face 19, ensuring proper seating of the pins within the semicircular groove of retainer 32 (as shown in greater detail in FIG. 8).

FIGS. 6–11 illustrate one sequence of steps that enable easy single-handed mating of computer 60 onto cradle 10 by a user. Optionally, a user can vertically load the forward end of computer 60, as depicted in FIG. 5, then rotate the computer into locked engagement with cradle 60. As shown in FIG. 6, a user drags laptop computer 60 via handle 62 across the forward end of cradle 20, causing dovetail 30 to make substantially planar contact with the bottom of the computer. For substantially all angles of orientation, dovetail 30 will align substantially parallel with the bottom of the computer. Therefore, 72 in slots 76 (as shown in FIGS. 7-11). During this initial loading phase, latch assembly 20 remains in a natural forward-biased resting state and connector assembly 22 remains in a natural vertically-biased resting state.

Figure 7:
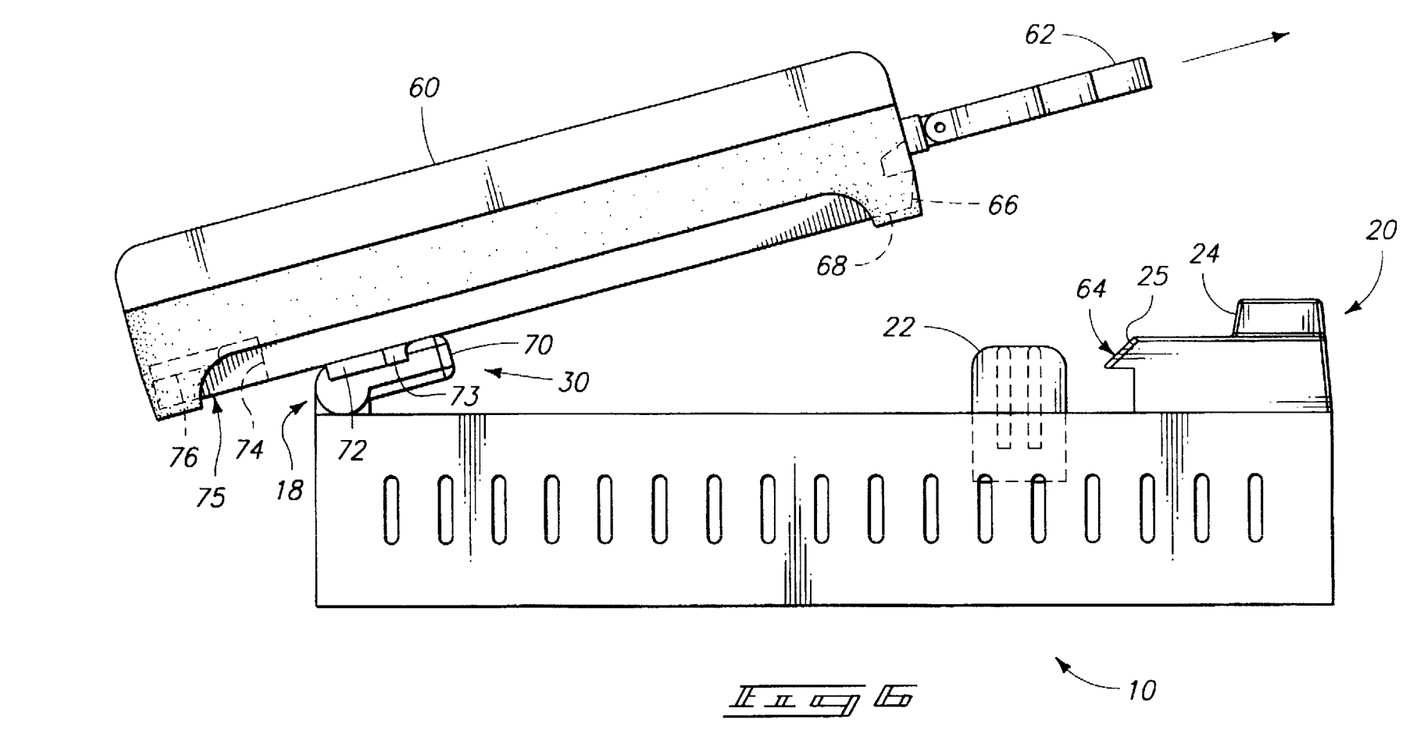
FIG. 7 is a side elevational view of the notebook computer and cradle assembly taken later in time than FIG. 6, with the front portion mating features being presented for engagement.

According to FIG. 7, computer 60 is illustrated subsequent in time to FIG. 6, where tapered wings 72 (including most of beveled ends 73) have cleared the rear-most vertical end of computer 60. As computer 60 is pulled forward and tapered wings 72 clear the end (and tenon 70 is aligned with opening 75), the end portion of tenon 70 seats within mortise 74, aligning wings 73 to be subsequently received into slots 76 by rearwardly backing computer 60 to mate with assembly 18 (according to FIG. 9). At this point in time, latch assembly 20 and connector assembly 22 still remain in their natural biased resting states.

Figure 8:
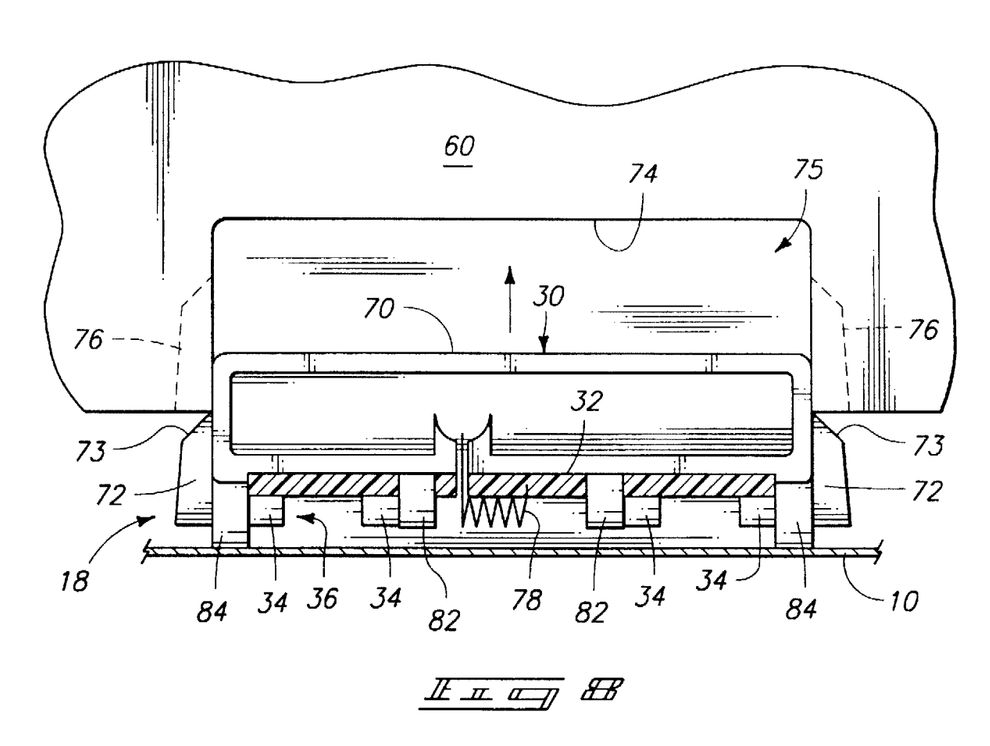
FIG. 8 is a plan view of the front portion mating features taken generally along line 8—8 of FIG. 7, with the retainer depicted in partial breakaway and the dovetail rotated to a vertical orientation to facilitate viewing.

FIG. 8 illustrates the forward mating features of computer and cradle as shown in FIG. 7, but with dovetail 30 rotated into a vertical position relative to the top of cradle 10 in order to facilitate viewing. Cradle 10 and retainer 32 are shown in section, along the centerline of retainer 32, in order to illustrate engagement between dovetail 30 and retainer 32. Accordingly, pins 34 can be seen engaged for pivotal movement within the top-most semicircular portion of groove 36 inside retainer 32. Rolling contact of arm 84 on the top surface of cradle 10 ensures such contact, while still enabling assembly of dovetail between retainer 32 and cradle 10. Spring 78 is shown mounted within groove 36, in a torsionally loaded configuration. One end engages the backside of tenon 70 and the other end engages with a small recess within retainer 32. Optionally, the other end engages with the inner surface of groove 36, beneath the semicircular portion. Fit-up of tenon 70 within mortise 74 can be clearly seen, as wings 72 are located just beyond the end of computer 60. Accordingly, the next step (see FIG. 9) is to push computer 60 into mating engagement with dovetail assembly 18, causing wings 72 to be received into slots 76. Ends 73 ensure alignment of wings 72 and tenon 70 during this mating operation.

FIG. 9 illustrates computer 60 and cradle 10 subsequent in time to that illustrated in FIGS. 7 and 8, after computer 60 has been backed into dovetail assembly 18, causing mating engagement at the forward end. From this position, computer 60 is then pivoted about assembly 18, causing engagement (or slamming) of heels 68 with bevelled faces 64 on fingers 25. By urging heels 68 against faces 64, fingers 25 and accompanying portions of latch assembly 22 are displaced away from assembly 18, causing fingers 25 to retract and enabling lowering of computer 60 onto the top face of cradle 10. As computer 60 is pivoted, connector assembly 22 is depressed, causing it to lower in engagement with the bottom of the computer.

Figure 10:
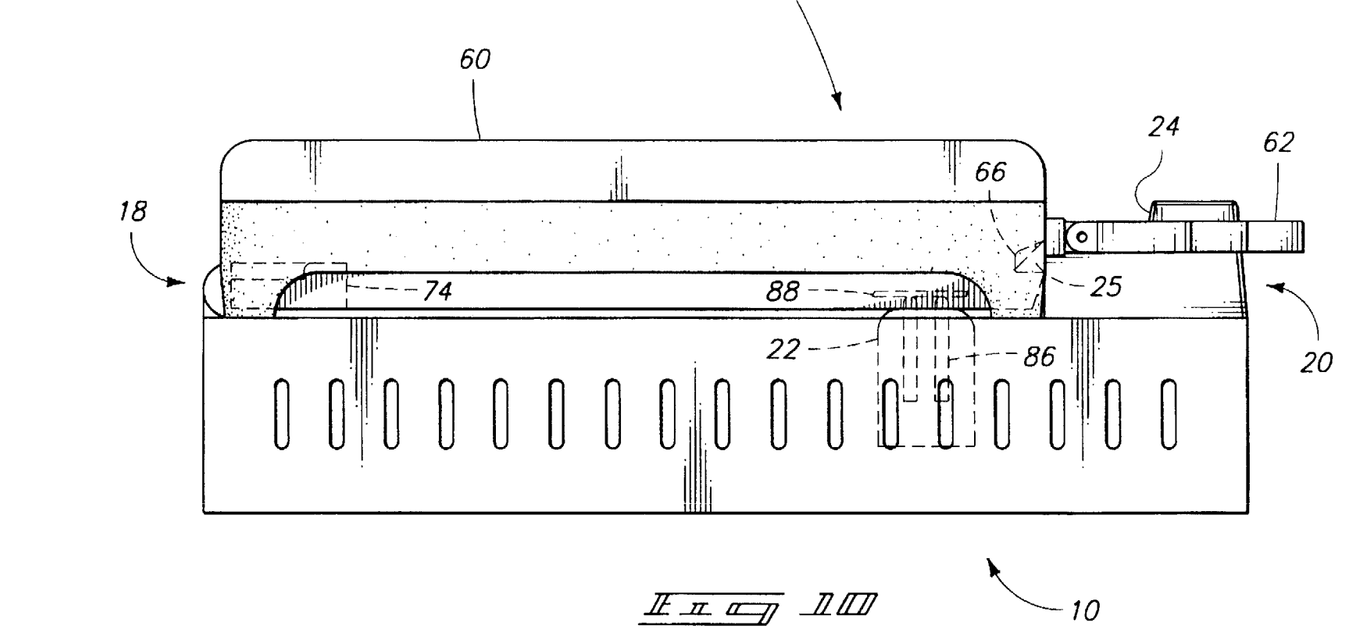
FIG. 10 is a side elevational view of the notebook computer and cradle assembly taken later in time than FIG. 9, after the rear portion mating features have been engaged by downwardly rotating the notebook computer.

FIG. 10 illustrates computer 60 subsequent in time to that shown in FIG. 9, with computer 60 mated in engagement at both ends with cradle 10. Dovetail assembly 18 of cradle 10 is fully mated at the front end with the computer, and latch assembly 20 is fully mated at the rear end of the computer. Fingers 25 have cleared the heels, and have seated into recesses 66, causing computer 60 to be securely retained at each end until an operator pulls trigger 24 towards handle 62, causing fingers 25 to retract therefrom when it is time to demate the computer therefrom. Connector assembly 22 is shown biased against the bottom of computer 60, in a lowered, or retracted configuration. Conductive pins 86 housed within assembly 22 are also spring biased against electrical contacts 88 provided on the bottom of computer 60, yet are retracted along with assembly 22. Latch assembly 20 is shown in its spring biased natural forward-positioned resting stated.

Figure 11:
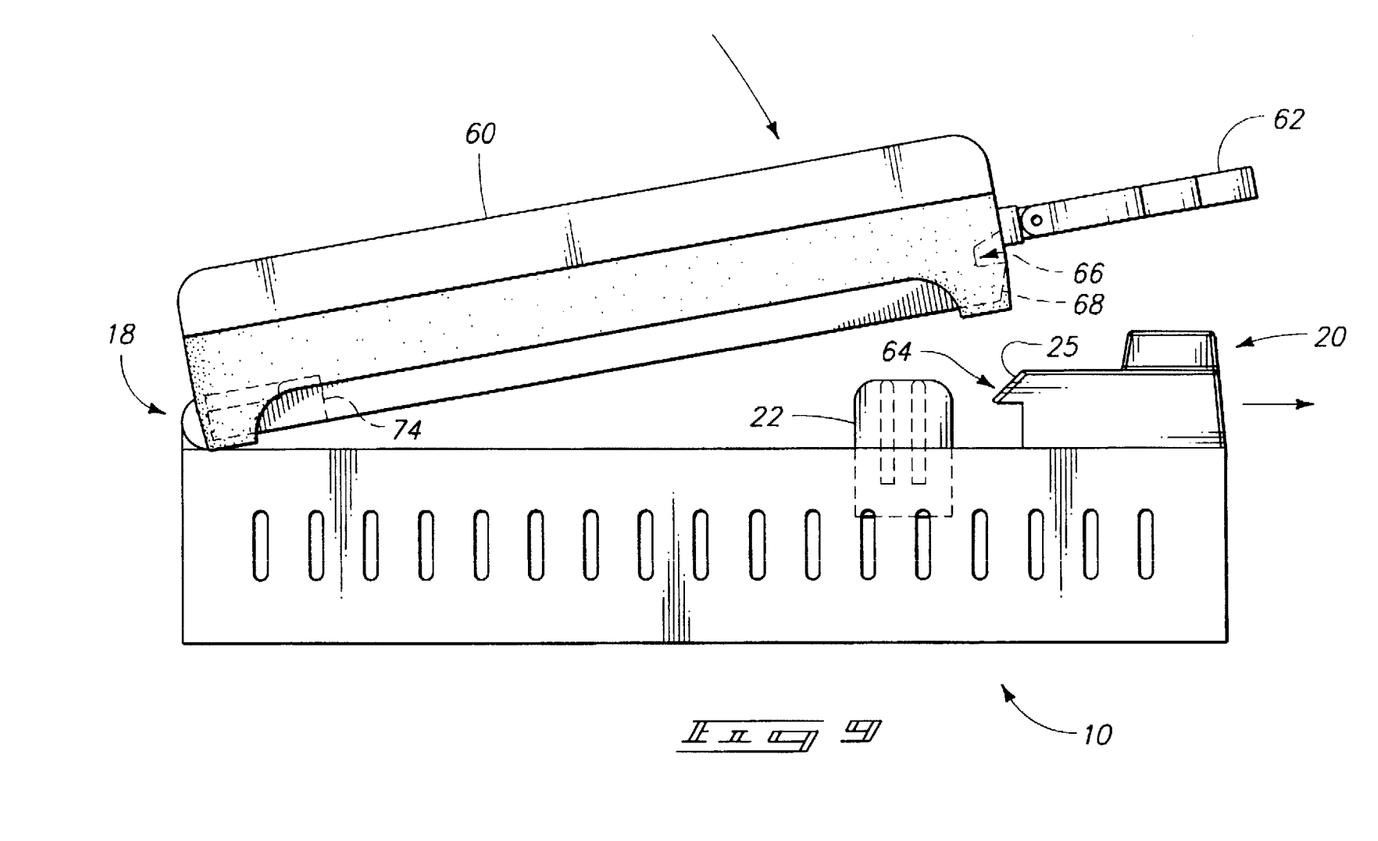
FIG. 11 is a partial breakaway side elevational view according to the fastened orientation depicted in FIG. 10, and further illustrating the engaged mating features.

FIG. 11 illustrates computer 60 mated, or mounted onto cradle 10, according to FIG. 10, but with partially broken away portions to better illustrate the front and rear mating features provided by dovetail assembly 18 and latch assembly 20, respectively, as they engage with complementary mating portions on computer 60. Simple single-handed 22 demating of computer 60 from cradle 10 can readily be seen in this view. A user can grasp handle 62 and, with one index finger, can then pull trigger 24 towards handle 62, causing fingers 25 to retract from recesses 66. Immediately thereafter, while holding trigger 24, the user can pivot computer 60 about assembly 18 upwardly, then pull handle 62 to demate computer 60 from assembly 18 and cradle 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A cradle for securing a portable electronic device, comprising:
   a base;
   a first mating member carried by the base and configured to removably receive and pivotally support a first end of a portable electronic device on the base;
   a second mating member carried by the base in spaced-apart and urgably movable fore/aft relation with the first mating member including a sloped contact face and a biasing spring, the second mating member configured to secure the portable electronic device to the base by pivotally moving a second end of the portable electronic device about the first mating member for latched engagement with the second mating member, the biasing spring configured to bias the second mating member into a load position toward the first mating member, the sloped contact face configured at the load location to be engaged by the portable electronic device during loading, the second mating member being urged away from the first mating member to receive a second end of the portable electronic device, the portable electronic device being releasably retained between the first and second mating members upon engagement therebetween.

2. The assembly of claim 1 wherein the first mating member comprises a tenon configured to removably mate with a portable electronic device.

3. The assembly of claim 2 wherein the first mating member further comprises a rib configured to be axially, slidably received into engagement with a portable electronic device.

4. The assembly of claim 1 wherein the first mating member is rotatably carried by the base.

5. The assembly of claim 4 wherein the first mating member further comprises a spring configured to bias the first mating member toward a substantially vertical configuration relative to the base.

6. The assembly of claim 1 wherein the second mating member comprises a latch assembly having at least one engaging finger supported for movement between fore and aft directions relative to the first mating member, the finger constructed and arranged to latch into engage with the portable electronic device to enable mating of the device between the first and the second mating members.

7. The assembly of claim 6 wherein the finger comprises the sloped contact face operative during engagement with a portable electronic device to impart aft translation of the finger during engagement, and latched mating of the finger with the portable electronic device.

8. The assembly of claim 6 wherein the latch assembly comprises a latch, movable between fore and aft directions, on which a pair of the fingers are carried in laterally spaced-apart relation.

9. The assembly of claim 1 wherein the portable electronic device comprises a notebook computer.

10. A cradle for securing a portable electronic device, comprising:
a base constructed and arranged to retain a portable electronic device;
a first member adapted to slidably mate with and pivotally carry a first end of the portable electronic device; and
a second member carried by the base for movement relative to the first member, the second member having a sloped contact face adapted to engage with the portable electronic device when mated with the first member for pivotal movement so as to bias the second member apart from the first member until urged into latched engagement therebetween such that the portable electronic device is releasably retained between the first and second members.

11. The assembly of claim 10 further comprising a vertically retractable, spring-biased electrical connector carried by the base for coupling with a portable electronic device.

12. The assembly of claim 10 wherein the first member is pivotally carried by the base, and the first member further comprises a spring configured to bias the first member in a substantially vertical configuration relative to the base so as to facilitate slidable mating with the portable electronic device.

13. The assembly of claim 10 wherein the first member and the second member are configured in spaced-apart relation to removably retain the portable electronic device therebetween.

14. The assembly of claim 13 wherein the second member comprises a latch assembly having at least one engaging finger supported for movement between fore and aft directions relative to the first member, the finger constructed and arranged to engage with the portable electronic device when pivotally loaded there against so as to enable mating of the device between the first and second members.

15. The assembly of claim 14 wherein the finger cooperates to form the sloped contact face of the second member.

16. The assembly of claim 14 wherein the latch assembly comprises a latch, movable between fore and aft directions, the sloped contact face and a pair of the fingers provided on the latch, and a spring configured to bias the latch into a loading position toward the first member.

17. The assembly of claim 10 wherein the first member is pivotally carried by the base so as to align a portable electronic device for engagement with the sloped contact face and latching with the second member.

18. The assembly of claim 10 wherein the portable electronic device comprises a notebook computer.

19. The assembly of claim 10 wherein the first member comprises a tenon configured to mate with a portable electronic device.

20. The assembly of claim 19 wherein the first member further comprises a rib carried by the mortise sized to mate in slidable engagement with a portable electronic device.

21. A combination cradle and portable electronic device, comprising:
a portable electronic device having a housing including a first complementary mating member and a second complementary mating member;
a cradle including a base, a first mating member carried by the base, and a second mating member carried by the base spaced apart from the first mating member, the first mating member adapted to mate with the first complementary mating member and pivotally support a received first end of the portable electronic device on the base, and the second mating member having a sloped contact face configured to mate in urged engagement with the portable electronic device as the portable electronic device is pivoted about the first mating member, the second mating member adapted to movably bias away from the first mating member responsive to the portable electronic device being pivoted into engagement with the contact face of the second mating member, the second mating member configured to latch into engagement with the second complementary mating member to secure the portable electronic device to the cradle.

22. The assembly of claim 21 wherein the first mating member comprises a tenon, with the complementary mating member comprising a mortise sized to receive the tenon.

23. The assembly of claim 22 wherein the first mating member further comprises a rib carried by the mortise, with the complementary mating member further comprising a slot sized to receive the rib in axially slidable engagement therebetween.

24. The assembly of claim 21 wherein the first mating member further comprises a spring configured to bias the first mating member, when unloaded, in a substantially vertical configuration relative to the base so as to facilitate substantially planar communication between a forward face of the first mating member and the device during mating therealong.

25. The assembly of claim 21 wherein the second mating member comprises a latch assembly having at least one engaging finger and the sloped contact face supported for movement between fore and aft directions relative to the first mating member, the finger constructed and arranged to engage with the second complementary mating member of the device so as to enable mating and demating of the device from between the first and the second mating members.

26. The assembly of claim 25 wherein the finger comprises a bevelled face configured to engage with the device during mating so as to impart aft translation of the finger during engagement, followed by mating of the finger with the complementary mating member.

27. The assembly of claim 25 wherein the latch assembly comprises a latch, movable between fore and aft directions, on which a pair of the fingers are carried in laterally spaced apart relation, and a spring configured to bias the latch into a loading position toward the first mating member.

28. The assembly of claim 21 wherein the portable electronic device comprises a notebook computer.

29. A docking station, comprising:

a base;

a connector pivotally carried by the base and configured to pivotally support a portable electronic device relative to the base; and a latch assembly carried by the base in spaced-apart relation with the connector and having a bevelled face configured to engage with the portable electronic device at a location spaced apart from the connector, the latch assembly adapted for movement away from the connector as the portable electronic device is pivotally urged in contact with the bevelled face such that the latch assembly engages the portable electronic device to secure the portable electronic device between the connector and the latch assembly.

30. The docking station of claim 29 wherein the latch assembly comprises a latch movable between fore and aft directions, responsive to urged contact with a portable electronic device.

* * * * *

UNITED STATES PATENT AND TRADEMARK OFFICE
CERTIFICATE OF CORRECTION

PATENT NO. : 5,751,546
DATED : May 12, 1998
INVENTOR(S) : Jay Clark, Jonathan LaMarche, Robert J. Tuttle, Sr.

It is certified that error appears in the above-identified patent and that said Letters Patent is hereby corrected as shown below:

Col. 1, line 45: delete "fastener" and insert --fastened--.

Col. 6, line 53: delete "nature" and insert --natural--.

Col. 7, line 9: after "Therefore," and preceding "72", insert --the user need only visually center the laptop over the top of cradle 10 to ensure subsequent alignment of tenon 70 with opening 75 along mortise 74, and subsequent receipt of tenon in mortise 74 and wings--.

Col. 8, line 10: delete "stated" and insert --state--.

Col. 8, line 16: after "single-handed", delete "22".

Col. 9, line 9: delete "engage" and insert --engagement--.

Signed and Sealed this

Fifteenth Day of September, 1998

Attest:

BRUCE LEHMAN

*Attesting Officer*    Commissioner of Patents and Trademarks